United States Patent [19]

Nomura et al.

[11] Patent Number: 4,662,464
[45] Date of Patent: May 5, 1987

[54] LOAD DETECTING MECHANISM

[75] Inventors: Misao Nomura; Utarou Fujioka, both of Tokyo, Japan

[73] Assignee: Shinko Denshi Company Limited, Tokyo, Japan

[21] Appl. No.: 845,528

[22] Filed: Mar. 28, 1986

[30] Foreign Application Priority Data

Apr. 3, 1985 [JP] Japan .............................. 60-49591[U]

[51] Int. Cl.$^4$ .......................... G01G 3/08; G01G 21/24
[52] U.S. Cl. ...................................... 177/229; 177/255
[58] Field of Search ................................ 177/229, 255

[56] References Cited

U.S. PATENT DOCUMENTS

| | | | |
|---|---|---|---|
| 4,062,416 | 12/1977 | Berg et al. | 177/229 X |
| 4,383,586 | 5/1983 | Lee | 177/229 |
| 4,433,742 | 2/1984 | Lee | 177/229 |
| 4,526,247 | 7/1985 | EerNisse et al. | 177/229 X |
| 4,585,083 | 4/1986 | Nishiguchi | 177/229 |

*Primary Examiner*—George H. Miller, Jr.
*Attorney, Agent, or Firm*—James W. Hellwege

[57] ABSTRACT

A load detecting mechanism is provided comprising
a vertical link extending in the vertical direction in which a load to be detected is exerted;
first and second leaf spring members each having a first end portion connected to an upper end of the vertical link and extending horizontally in different first and second directions, respectively;
third and fourth leaf spring members each having a first end portion connected to a lower end of the vertical link and extending horizontally and parallel to said first and second directions, respectively;
a rigid block member having at least first, second and third end portions extending vertically and formed integrally with each other, the first end portion of said rigid block member being adjacent the vertical link, second end portions of the first and third leaf spring members being secured to the upper and lower ends of the second end portion of said rigid block member, respectively, to form a first parllelogram link mechanism, and second end portions of the second and fourth leaf spring members being secured to the upper and lower ends of the third end portion of said rigid block member, respectively, to form a second parallelogram link mechanism; and
a load sensor positioned between the vertical link and the first end portion of the block member.

10 Claims, 6 Drawing Figures

LOAD DETECTING MECHANISM

BACKGROUND OF THE INVENTION

Field of the Invention and Related Art Statement

The present invention relates to a load detecting mechanism for use in a scale, particularly a small top loading scale.

FIGS. 1A and 1B are perspective and side views, respectively of a known typical top loading scale. The load detecting mechanism is fixed on a base plate 1 made of rigid material. On the base plate 1 there are formed a pair of root portions 2A and 2B to which cylindrical posts 3A and 3B having a given length are secured by means of screws. Upper ends of the posts 3A and 3B are coupled with each other by a reinforcing plate 4. The top loading scale further comprises upper and lower V-shaped leaf springs 5 and 6. Free ends of leg portions 5A and 5B of the upper V-shaped leaf spring 5 are clamped between top ends of the posts 3A and 3B and the reinforcing plate 4, and free ends of leg portions 6A and 6B of the lower V-shaped leaf spring 6 are clamped between the root portions 2A and 2B and lower ends of the posts 3A and 3B. The leg portions 5A and 5B of the upper leaf spring 5 are extended in parallel with the leg portions 6A and 6B of the lower leaf spring 6, respectively. Base portions of the V-shaped leaf springs 5 and 6 are secured to upper and lower ends of a vertical link 7, respectively. In this manner, the vertical link 7, leg portions 5A and 6A of upper and lower leaf springs 5 and 6 and post 3A constitute a parallelogram link mechanism, and similarly the vertical link 7, leg portions 5B and 6B and post 3B form a parallelogram link mechanism. Thus the loading system forms a Roberval mechanism and the vertical link 7 is supported by the leaf springs 5 and 6 movably in the vertical direction approximately.

As clearly illustrated in FIG. 1B an L-shaped member 9 is secured to the base plate 1, and an upper end of a load sensor 11 is connected to a free end of the L-shaped member 9, a lower end of the load sensor 11 being coupled with a projection 10 integrally formed with the vertical link 7. Further, a top weighing pan 12 is secured to the upper end of the vertical link 7 by means of a pan receiving rod 8. In the V-shaped leaf springs 5 and 6 there are formed flexures 13 at positions near the posts 3A, 3B and vertical link 7 by locally thinning a thickness of the leaf springs.

In the known top loading scale having the construction explained above, when a load W is correctly applied to the top weighing pan 12 at its center as shown by an arrow A in FIG. 1B, the load W is transferred to the load sensor 11 and can be detected correctly. However, when a load W' is applied to the weighing pan 12 at a postion deviated from its center as illustrated by an arrow B, the load W' is no longer transferred correctly to the load sensor 11 and a so-called shift error might occur. This is mainly due to the fact that the Roberval mechanism could not maintain its ideal parallelogram shape, because the loading mechanism is formed by assembling a plurality of components or parts. When a load is applied at an off-center position or an excessively large load is applied, there might be introduced twisting and bending moments in various components such as root portions 2A, 2B, posts 3A, 3B, reinforcing plate 4, L-shaped member 9 and base plate 1, so that the load detecting mechanism might be subjected to complicated elastic deformation and strain.

In the known load detecting mechanism, in order to reduce the above explained shift error, the various components are adjusted and assembled precisely. However, it is almost impossible to reduce the shift-error in all directions over a wide range of loading size. For instance, even if the shift-error in a front and rear direction can be reduced satisfactorily, the shift-error in a right and left direction could not be decreased to an allowable value. Further, although the shift-error could be reduced effectively for a small load up to 1 kg when the load larger than 3 kg is applied, the shift-error might be increased to an inpermissible large value. Moreover, the components are made of various materials having different thermal capacities, heat conductivities and thermal expansion coefficients, and therefore the shift-error fluctuates in accordance with the ambient temperature change and time passage.

It is apparent that since the known load detecting mechanism is composed of the various components, the assembling work becomes very cumbersome and requires a long time. Therefore, the cost of the known load detecting mechanism is liable to be high.

SUMMARY OF THE INVENTION

The present invention has for its object to provide a novel and useful load detecting mechanism which can mitigate the drawbacks of the known load detecting mechanism and can measure the applied load precisely without being affected by the shift-error which has a tendency to fluctuate by temperature change, time passage and load size difference.

It is still another object of the invention to provide a load detecting mechanism which can be easily assembled from a smaller number of components.

According to the invention, a load detecting mechanism comprises a vertical link extending in the vertical direction in which a load to be detected is exerted;

first and second leaf spring members each having a first end portion connected to an upper end of the vertical link and extending horizontally in different first and second directions, respectively;

third and fourth leaf spring members each having a first end portion connected to a lower end of the vertical link and extending horizontally and parallel to said first and second directions, respectively;

a rigid block member having at least first, second and third end portions extending vertically and formed integrally with each other, the first end portion being adjacent the vertical link, second end portions of the first and third leaf spring members being secured to the upper and lower ends of the second end portion, respectively, to form a first parallelogram link mechanism, and second end portions of the second and fourth leaf spring member being secured to the upper and lower ends of the third end portion, respectively, to form a second parallelogram link mechanism; and a load sensor positioned between the vertical link and the first end portion of the block member.

DESCRIPTION OF THE PREFERRED EMBODIMENTS

Figure 1A:
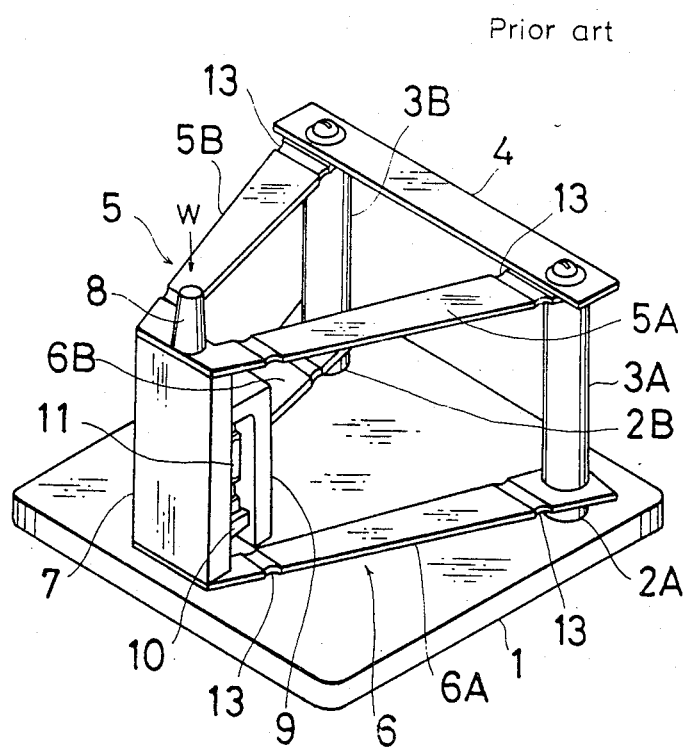
FIGS. 1A and 1B are perspective and side views, respectively showing a top loading scale having the known load detecting mechanism.
Figure 1B:
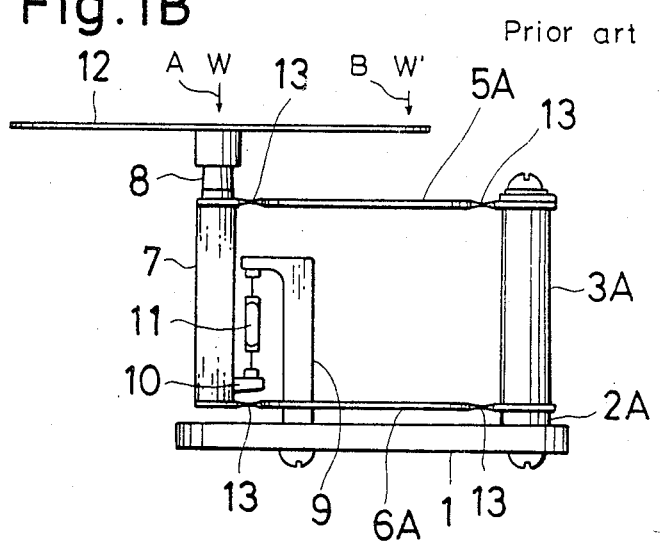
Figure 2:
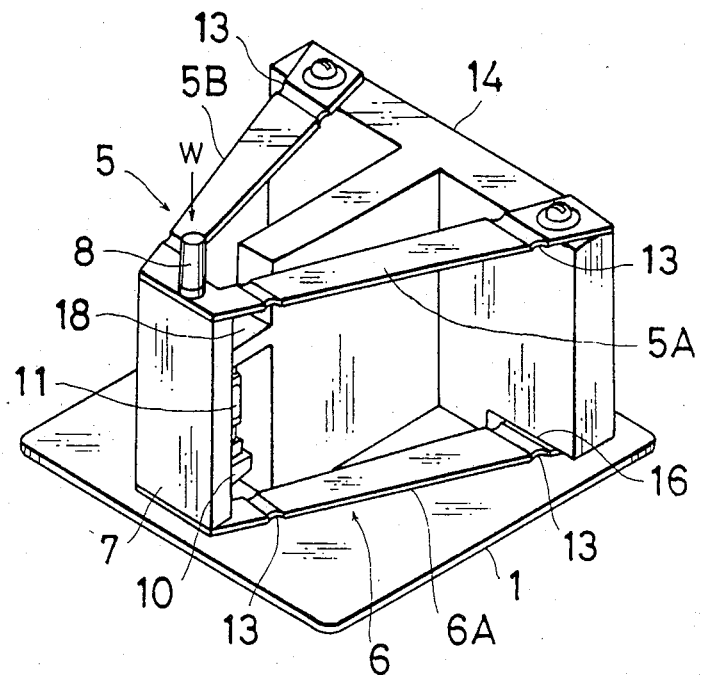
FIGS. 2 and 3 are perspective and side views, respectively illustrating a top loading scale comprising the load detecting mechanism according to the invention.
Figure 3:
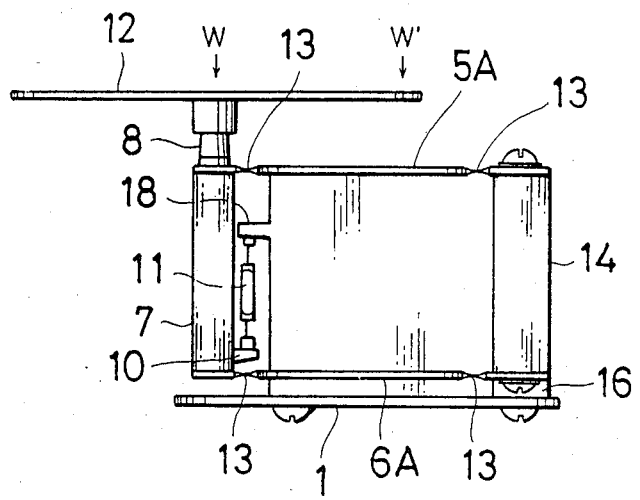
Figure 4:
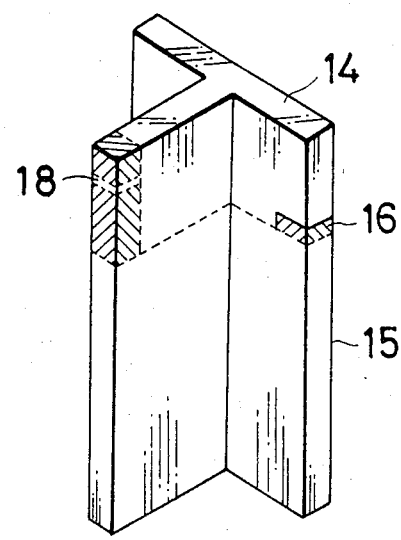
FIGS. 4 and 5 are perspective views showing raw materials from which the block member according to the invention is cut out.
Figure 5:
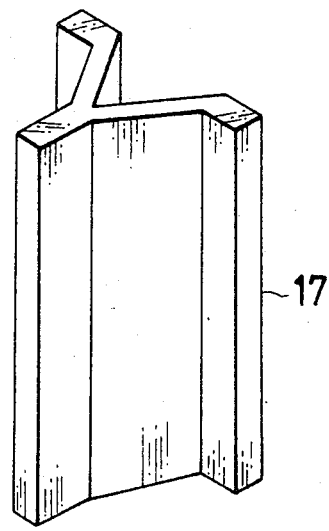

FIGS. 2 and 3 are perspective and side views, respectively showing a top loading scale having the load detecting mechanism according to the invention. In FIGS. 2 and 3, portions similar to those shown in FIGS. 1A and 1B are denoted by the same reference numerals as those used in FIGS. 1A and 1B. According to the invention, the load detecting mechanism comprises a single metal block member 14 instead of the root portions 2A, 2B, posts 3A, 3B, reinforcing plate 4 and L-shaped member 9 of the known load detecting mechanism illustrated in FIGS. 1A and 1B. In the present embodiment the block member 14 has a substantially T-shaped cross section and may be formed by cutting an extrusion member 15 shown in FIG. 4 along a broken line and removing portions denoted by hatching. It should be noted that the block member 14 may also be cut out of an extrusion member 17 illustrated in FIG. 5 having a substantially Y-shaped cross section. Further, the block member may be formed into other cross sections such as V shape. The block member 14 may be made of light alloy, and then the load detecting mechanism may be light in weight and the temperature property may be simplified or improved because of its simple construction and good heat conductivity. Therefore, any errors due to temperature may be reduced and easily compensated for.

A base portion of an upper V-shaped leaf spring 5 is secured to an upper end of a vertical link 7, and free ends of leg portions 5A and 5B of the leaf spring 5 are secured to upper ends of the block member 14. A base portion of a lower V-shaped leaf spring 6 is fixed to a lower end of the vertical link 7, and free ends of leg portions 6A and 6B of the lower leaf spring 6 are secured to cut-out portions 16 formed in a lower surface of the block member 14. A height of the vertical link 7 is made equal to a distance from the upper end of the block member 14 to cut-out portions 16. Therefore, the upper and lower V-shaped leaf springs 5 and 6, vertical link 7 and T-shaped block member 14 form a pair of parallelograms and thus a Roberval mechanism. A top weighing pan 12 is coupled with the vertical link 7 by means of a pan receiving rod 8 to form a top loading scale.

The T-shaped block member 14 is secured to the base plate 1 by means of screws at three positions. It should be noted that the block member 14 may also be fixed to the base plate 1 at one or two positions. However, in the present embodiment, since the block member 14 is secured to the base plate 1 with the aid of the three screws, the block member 14 and base plate 1 are combined substantially integrally and thus even if the base plate 1 is thin, the assembly become strong and rigid and is hardly deformed even if a large load is applied at an off-center position. Due to the above explained fact, according to the invention the base plate 1 may be dispensed with and the block member 14 may be directly secured to a casing of the top loading scale. Then the number of components and the cost of the top loading scale may be further reduced.

A tension type load sensor 11 is arranged between the block member 14 and vertical link 7. That is to say, an upper end of the load sensor 11 is secured to a projection 18 formed integrally with the block member 14 and a lower end of the load sensor 11 is fixed to a projection 10 formed integrally with the vertical link 7. It should be noted that the load sensor 11 may also be secured directly to the block member 14 and vertical link 7 without providing the projections 10 and 18. Further, when a load sensor of compression type is used, an upper end of the load sensor is secured to the vertical link 7 and a lower end of the load sensor is fixed to the block member 14.

In the load detecting mechanism according to the invention, when a load W' is applied at an off-center position of the weighing pan 12, the load is transferred to the load sensor 11 in a vertical direction and at the same time bending and twisting moments are applied to the block member 14 by means of the V-shaped leaf springs 5 and 6. However, since the block member 14 has a very large section modulus and has a very strong rigidity against the bending and twisting moments, the block member 14 is minimally deformed and distorted. Further, since the block member 14 is integrally coupled with the base plate 1 or the casing of a scale, distortion can be reduced, even more. In this manner, the Roberval mechanism maintains the ideal shape of the parallelogram even if a large load is applied to the weighing pan at an off-center position. Therefore, the load to be measured is correctly transferred to the load sensor 11 and a highly precise measurement can be performed.

The present invention is not limited to the above embodiments, but may be modified within the scope of the invention. For instance, the leaf springs may be formed into U-shape or ⊔-shape instead of V-shape. Further each of the upper end lower leaf springs may be formed separately by two leaf springs arranged on the same horizontal plane. Moreover in the above embodiment the load sensor 11 is formed by a tuning fork vibrator, but it may be formed by a vibrating string, load cell of strain gauge type or electromagnetic force balance mechanism.

The advantageous effects of the load detecting mechanism according to the invention may be summarized as follows.

(1) Since the number of components for constituting the load detecting mechanism can be reduced materially, the components can be manufactured at a low cost and the steps and cost of assembling work can be also reduced to a great extent. Moreover, the load detecting mechanism can be assembled precisely and uniformly without requiring special experienced skill, and fluctuations of characteristics in each load detecting mechanism can be reduced. In this manner, it is possible to obtain the load detecting mechanism having a high quality at a low price.

(2) Since the mechanical strength of the load detecting mechanism is increased, the distortion is hardly induced even if a large load is applied at an off-center position, and thus the shift error is hardly produced. Therefore, the load is correctly applied to the load sensor and the measurement can always be effected accurately.

(3) Since the block member has a large mechanical strength, the base plate may be thinned or dispensed with, the weight and cost of the scale can be decreased.

What is claimed is:

1. A load detecting mechanism comprising
   a vertical link extending in the vertical direction in which a load to be detected is exerted;
   first and second leaf spring members each having a first end portion connected to an upper end of the vertical link and extending horizontally in different first and second directions, respectively;
   third and fourth leaf spring members each having a first end portion connected to a lower end of the vertical link and extending horizontally and parallel to said first and second direction, respectively;
   a rigid block member having at least first, second and third end portions extending vertically and formed integrally with each other, the first end portion of the rigid block member being adjacent the vertical link, second end portions of the first and third leaf spring members being secured to the upper and lower ends of the second end portion of the rigid block member, respectively, to form a first parallelogram link mechanism, and second end portions of the second and fourth leaf spring members being secured to the upper and lower ends of the third end portion of the rigid block member, respectively, to form a second parallelogram link mechanism; and
   a load sensor positioned between the vertical link and the first end portion of the block member.

2. A mechanism according to claim 1, wherein said block member is formed by extrusion.

3. A mechanism according to claim 1, wherein said block member is comprised of a light alloy.

4. A mechanism according to claim 1, wherein said block member comprises a T-shaped block member, said first end portion being constituted by an end portion of a vertical stroke of the T, and said second and third end portions being constituted by respective end portions of a horizontal stroke of the T.

5. A mechanism according to claim 1, wherein said block member is formed by a Y-shaped block member, said first end portion being constituted by an end portion of a vertical stroke of the Y, and said second and third end portions being constituted by end portions of respective inclined strokes of the Y.

6. A mechanism according to claim 1, wherein said block member is formed by a V-shaped block member, said first end portion being constituted by a base portion of the V, and said second and third end portions being constituted by end portions of respective inclined strokes of the V.

7. A mechanism according to claim 1, wherein said first and second leaf spring members are integrally formed by a first V-shaped leaf spring, and said third and fourth leaf spring members are integrally formed by a second V-shaped leaf spring.

8. A mechanism according to claim 1, wherein said first, second, third and fourth leaf spring members have flexures formed therein at positions near the vertical link and block member.

9. A mechanism according to claim 1, wherein said load sensor is formed by a tension type load sensor and upper and lower ends of the load sensor are secured to the block member and vertical link, respectively.

10. A mechanism according to claim 1, wherein said load sensor is formed by a compression type load sensor and upper and lower ends of the load sensor are secured to the vertical link and block member, respectively.

* * * * *